E. KARNS.
TIME CONTROLLED DAM GATE.
APPLICATION FILED JAN. 3, 1918.
1,371,172.
Patented Mar. 8, 1921.
2 SHEETS—SHEET 1.
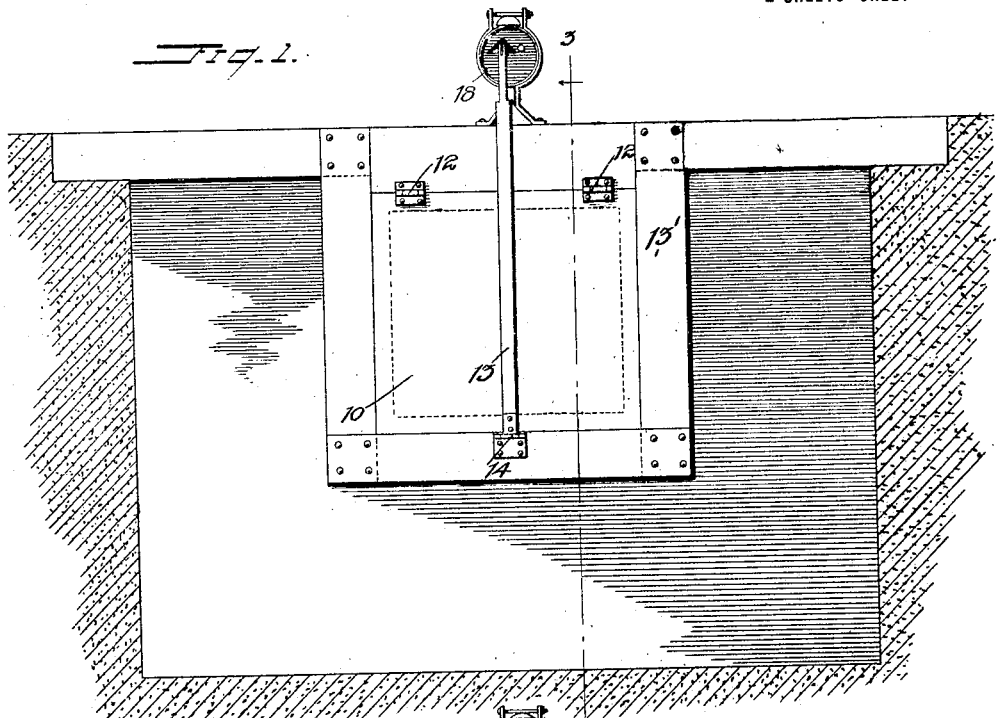
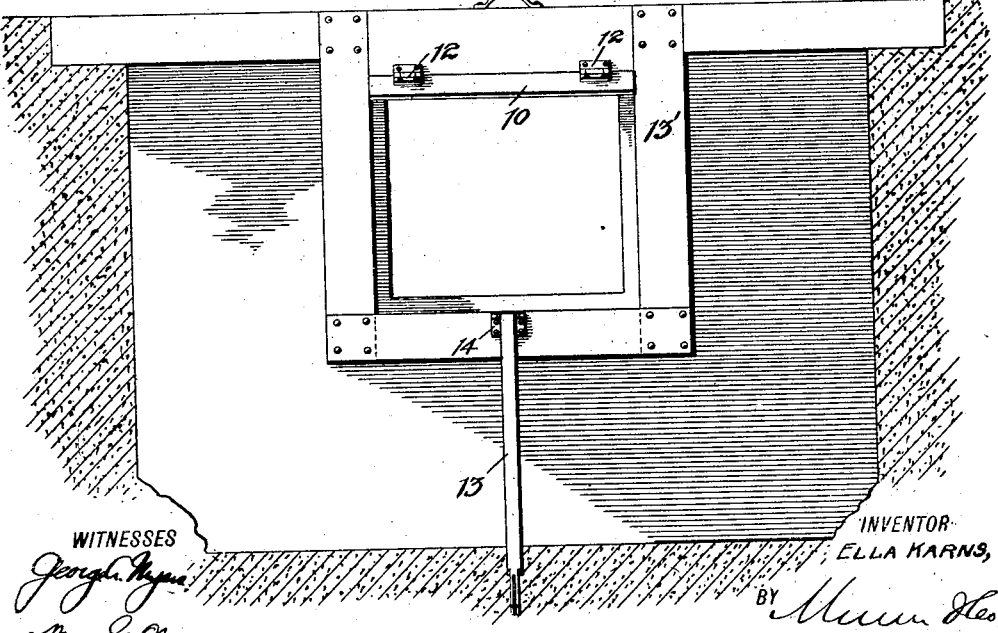
WITNESSES
INVENTOR
ELLA KARNS,
BY
ATTORNEYS

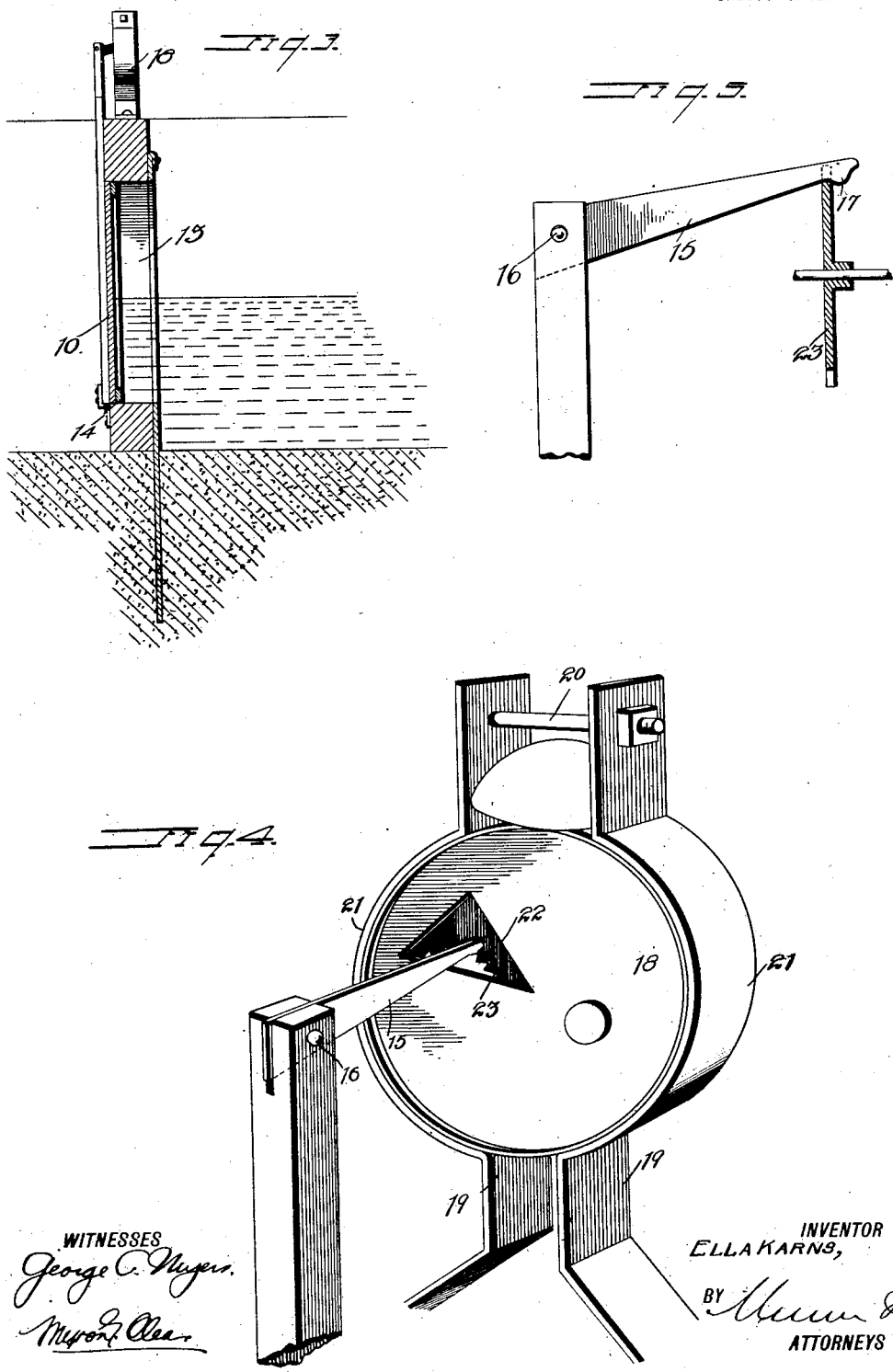

UNITED STATES PATENT OFFICE.

ELLA KARNS, OF JACKSON, WYOMING.

TIME-CONTROLLED DAM-GATE.

1,371,172.  Specification of Letters Patent.  Patented Mar. 8, 1921.

Application filed January 3, 1918. Serial No. 210,106.

*To all whom it may concern:*

Be it known that I, ELLA KARNS, a citizen of the United States, and a resident of Jackson, in the county of Lincoln and State of Wyoming, have made certain new and useful Improvements in Time-Controlled Dam-Gates, of which the following is a specification.

My present invention relates generally to dam gates and more particularly to time controlled mechanism for normally holding the dam gate in closed position so regulated as to permit of its ready release for the outflow of the dammed fluid at any desired time.

The objects of my invention are the provision of a simple and inexpensive mechanism, particularly with respect to the means utilized to normally hold the dam gate closed, and capable of application to gates of various form, as will be presently made plain.

In the accompanying drawing illustrating my present invention,

Figure 1 is a sectional elevation illustrating the dam gate closed and the mechanism in operative position.

Fig. 2 is a similar view illustrating the mechanism released and in inoperative position with the dam gate open, Fig. 3 is a vertical section taken substantially on line 3—3 of Fig. 1.

Fig. 4 is a detailed perspective view of certain portions of the controlling connections including a time mechanism, and.

Fig. 5 is a detailed side view of certain of the parts seen in Fig. 4.

Referring now to these figures I have shown a dam gate at 10, in Figs. 1, 2 and 3, which is preferably hinged at 12 along its upper edge in connection with the frame 13, the latter of which as well as the remaining structure of the dam, may be of any suitable type and construction. The gate 10 itself may also be of various types and structures, although for purposes of automatic opening, it is preferable as above stated, to hinge the same along its upper edge, leaving its lower edge free and controllable by an upright controlling bar 13, the lower end of which is hinged as at 14 to the door frame 13' at a point below the center of the door 10, so that minimum holding power will be required to maintain the gate 10 closed, in view of the proximity of the lower free edge of the gate to the hinged end of the controlling bar 13.

The opposite end, and the upper end, of the controlling bar 13, in operative position, has a laterally extending arm 15 pivoted thereto as at 16, and provided at its free end with a curved engaging lug 17, and in accordance with my invention I mount a time controlling device upon the dam in suitable position above the gate 10 in the present instance shown as in the form of an alarm clock 18 of any suitable construction in general mounted within a support consisting of spaced clamping brackets 19, the lower ends of which are securely fastened to the dam or to the gate frame 13', and the upper ends of which are connected by a clamping bolt 20, so as to rigidly clasp the alarm clock 18 between the intermediate curved portions 21 of the brackets.

In further accordance with my invention, the rear wall of the alarm clock 18 has a cut out portion 22, exposing a portion of its alarm mechanism, and its alarm mechanism is provided with a toothed wheel 23, with the ratchet teeth of which the rounded lug 17 of the engaging arm 15 is adapted to engage with just sufficient holding power as is required by virtue of the construction previously described. It will be obvious that minimum of holding power will be required by virtue of the extension of controlling bar 13 as previously described. The lug 17 may be engaged with any tooth of the wheel 23, and is lifted on the tooth by virtue of rotation of the wheel, so that it will be free to move between two teeth when the tooth previously holding the same passes therebeyond. The arm 15 yields on pivot 16 as the lug is lifted, and the pressure to which the controlling bar 13 is subjected at all times, pulls the arm 15 free as soon as the lug 17 is released as above.

Thus with the parts in the engaged position as seen in Fig. 1, the alarm mechanism of the clock 18 is set at the time it is desired the gate 10 to open, and when the alarm mechanism operates, the teeth of the wheel 23 will shift the free end of the arm 15 out of engagement therewith, permitting the controlling bar 13 to move outwardly and downwardly upon its hinge 14, under pressure of the weight of fluid at the opposite side of the gate 10, which weight of fluid then opens the gate 10 in its passage by the same.

It is thus obvious that my invention provides a simple and inexpensive mechanism for this purpose, which may be readily mounted and utilized in connection with dam gates and dams of various types of construction, and that it will be positive and efficient in its action.

I claim:—

1. The combination with a gate or door hinged along one edge and having its relatively opposite edge free, a controlling bar hinged at a point slightly beyond the free edge of the gate or door, and arranged to extend centrally across the gate or door beyond the hinged edge thereof, an engaging arm pivotally connected to the free end of said controlling bar and provided at its free end with a rounded extending lug, and a time controlling mechanism including a movable member with which the rounded lug of the said arm is adapted to normally engage.

2. A time controlling mechanism of the character described including the combination of a door or gate hinged along one edge and having its opposite edge free, a controlling bar hinged at a point adjacent to the free edge of the door and arranged to extend across the latter intermediate its sides and to a point beyond its hinged edge, an engaging arm pivoted to the opposite end of said bar, a time controlling mechanism including a movable member with which said arm is adapted to engage when the movable member is stationary, and means to support said time controlling mechanism mounted at a point adjacent to the gate or door.

3. A time controlling mechanism of the character described including the combination of a door or gate hinged along one edge and having its opposite edge free, a controlling bar hinged at a point adjacent to the free edge of the door and arranged to extend across the latter intermediate its sides and to a point beyond its hinged edge, an engaging arm pivoted to the opposite end of said bar, a time controlling mechanism including a movable member with which said arm is adapted to engage when the movable member is stationary, means to support said time controlling mechanism mounted at a point adjacent to the gate or door and including a pair of upright brackets, the lower ends of which are fixed in spaced relation and the upper ends of which are provided with a connecting bolt to draw the brackets toward one another and clamp the said mechanism therebetween.

4. The combination with a dam gate hinged along its upper edge to swing open at its lower edge, of a controlling bar hinged at one end below the central portion of the lower edge of the gate and normally extending upwardly across that face of the gate adjacent the opening side thereof, and above the upper hinged edge of the gate, a movable arm carried by the upper free end of said bar, and a time controlling mechanism including a movable part normally engaged by the said arm.

ELLA KARNS.